United States Patent
Poole

(10) Patent No.: US 8,881,239 B1
(45) Date of Patent: Nov. 4, 2014

(54) METHOD AND APPARATUS FOR SECURING TRANSACTIONS USING VERIFIED RESOURCE LOCATIONS

(75) Inventor: James Cabell Poole, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 824 days.

(21) Appl. No.: 12/409,464

(22) Filed: Mar. 23, 2009

(51) Int. Cl.
| | | |
|---|---|---|
| G06F 7/04 | (2006.01) | |
| H04L 29/06 | (2006.01) | |
| H04L 9/32 | (2006.01) | |
| G06F 21/00 | (2013.01) | |
| G06F 15/16 | (2006.01) | |
| G06Q 20/00 | (2012.01) | |

(52) U.S. Cl.
USPC ............... 726/4; 726/26; 713/165; 713/166; 713/168; 713/182; 709/217; 709/219; 705/64; 705/67

(58) Field of Classification Search
USPC ............... 726/4, 26; 713/165, 166, 168, 182; 709/217, 219; 705/64, 67
See application file for complete search history.

(56) References Cited

U.S. PATENT DOCUMENTS

| | | | | |
|---|---|---|---|---|
| 7,797,532 | B2 * | 9/2010 | Miura et al. ................... | 713/156 |
| 2007/0220123 | A1 * | 9/2007 | Agrawal ........................ | 709/223 |
| 2008/0033646 | A1 * | 2/2008 | Morgan et al. ................ | 701/213 |
| 2009/0150671 | A1 * | 6/2009 | Abe ............................... | 713/169 |
| 2009/0157549 | A1 * | 6/2009 | Symons .......................... | 705/44 |
| 2009/0307141 | A1 * | 12/2009 | Kongalath et al. .............. | 705/72 |
| 2010/0023455 | A1 * | 1/2010 | Dispensa et al. ................ | 705/44 |
| 2010/0024017 | A1 * | 1/2010 | Ashfield et al. .................... | 726/7 |
| 2010/0076829 | A1 * | 3/2010 | Bishop ........................ | 705/14.15 |
| 2010/0180039 | A1 * | 7/2010 | Oh et al. ........................ | 709/228 |

* cited by examiner

*Primary Examiner* — Aravind Moorthy
(74) *Attorney, Agent, or Firm* — Campbell Stephenson LLP

(57) ABSTRACT

A method and apparatus for securing transactions using verified resource locations is described. In one embodiment, the method for authorizing a transaction request using published location information for at least one resource includes examining relationship data regarding at least one resource to identify at least one publisher computer and at least one subscriber computer, wherein the at least one publisher computer communicates location information for the at least one resource and in response to at least one transaction request from the at least one subscriber computer, comparing the location information with the at least one transaction request to verify at least one resource location.

18 Claims, 3 Drawing Sheets

US 8,881,239 B1

METHOD AND APPARATUS FOR SECURING TRANSACTIONS USING VERIFIED RESOURCE LOCATIONS

BACKGROUND OF THE INVENTION

1. Field of the Invention

Embodiments of the present invention generally relate to a personal transaction security and, more particularly, to a method and apparatus for securing transactions using verified resource locations.

2. Description of the Related Art

In a typical computing environment, an organization may employ a number of technologies to protect, produce and secure mission critical data. For example, the organization may employ one or more security systems to detect and/or mitigate network-based threats, such as viruses, intrusions, SPAM and/or the like. Furthermore, the one or more security systems may be designed to secure various transactions conducted by various resources (e.g., people). For example, a bank may utilize a security system to authorize Automated Teller Machine (ATM) withdrawal requests from one or more account holders.

Currently, the one or more security systems utilize identity verifications techniques to determine if a particular transaction is to be authorized. Hence, if an identity associated with the transaction cannot be verified, the particular transaction should not be authorized. For example, if a person making an ATM withdrawal does not match identification information (e.g., social security number, residential address, personal identification number (PIN), security question answers, current ZIP code and/or the like) that is associated with an account holder, the bank does not release any funds. Unfortunately, the one or more security systems are limited because a person who successfully misappropriates a resource identity circumvents such identity verification techniques.

Therefore, there is a need in the art for a method and apparatus for securing transactions using verified resource locations.

SUMMARY OF THE INVENTION

Embodiments of the present invention generally include method and apparatus for securing transactions using verified resource locations. In one embodiment, the method for authorizing a transaction request using published location information for at least one resource includes examining relationship data regarding at least one resource to identify at least one publisher computer and at least one subscriber computer, wherein the at least one publisher computer communicates location information for the at least one resource and in response to at least one transaction request from the at least one subscriber computer, comparing the location information with the at least one transaction request to verify at least one resource location.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
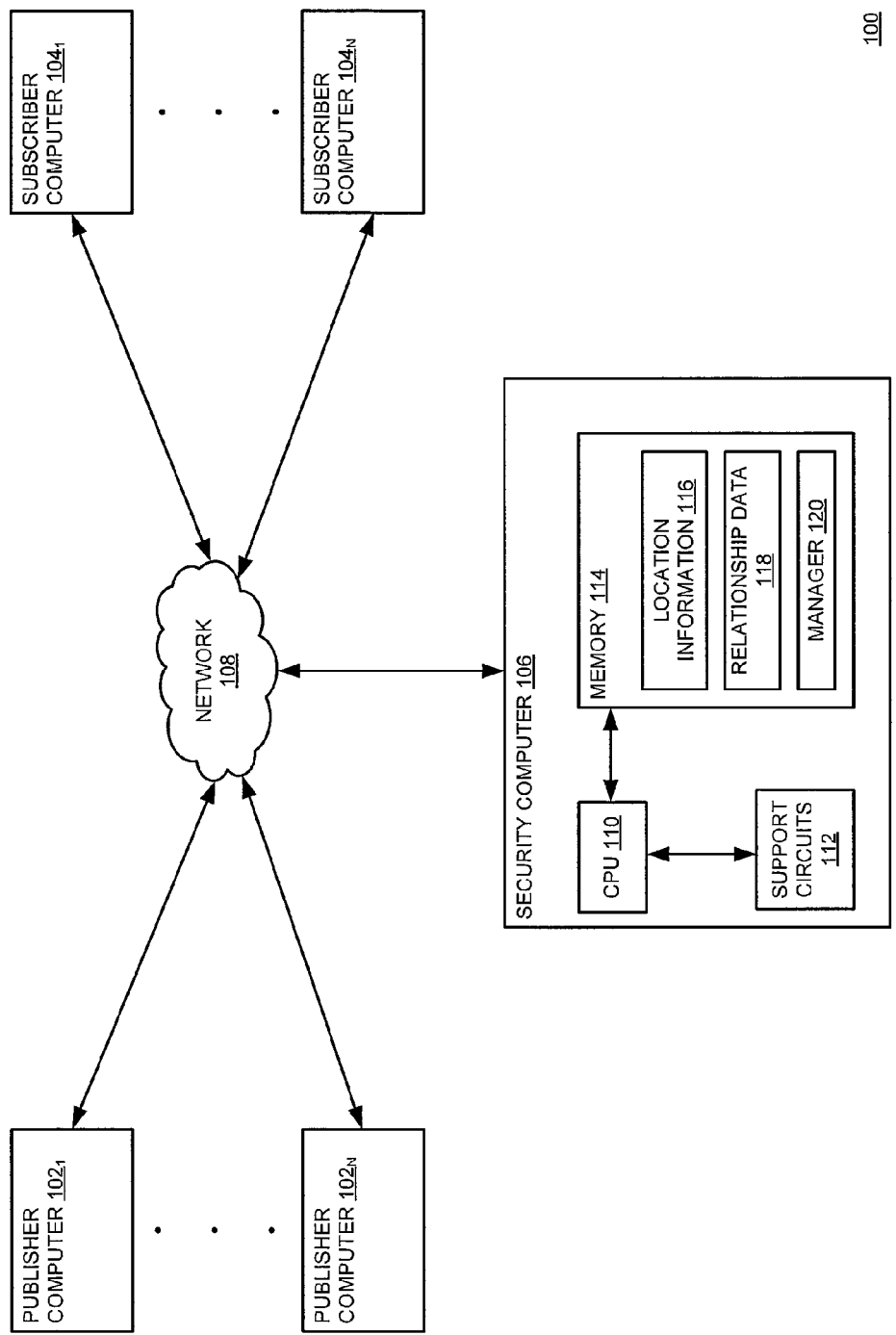
FIG. 1 is a block diagram of a system for securing transactions using verified resource locations according to one or more embodiments of the present invention.

FIG. 1 is a block diagram of a system 100 for securing transactions using verified resource locations according to one or more embodiments of the present invention. The system 100 includes a plurality of publisher computers 102, a plurality of subscriber computers 104 and a security computer where each is coupled to each other through a network 108.

Generally, a resource refers to an entity (e.g., a person, a corporation, a mobile vehicle, a government agency and/or the like) that periodically migrates from one location to another location. For example, a person may live in one state but work in another state. As such, the person may not always be in a particular location at any given time. Furthermore, the person may use a GPS-enabled phone to publish the location information 116 at various times.

Each of the plurality of publisher computers 102 and/or the plurality of subscriber computers 104 may be a type of computing device (e.g., a laptop, a desktop, a Personal Digital Assistant (PDA), a mobile phone and/or the like), such as those generally known in the art. For example, the plurality of publisher computers 102 may include badge readers, GPS-enabled devices (e.g., phones, trackers and/or the like), travel agency computers, a status update system (e.g., Twitter, LinkedIn and/or the like). Furthermore, the plurality of subscriber computers 104 may include banking systems, credit card systems and/or the like. As described further, relationships may form between various ones of the plurality of publisher computers 102 and the plurality of subscriber computers 104. Furthermore, the plurality of publisher computers 102 provide locations of one or more resources, which are requested by the plurality of subscriber computers 104. As such, the plurality of publisher computer 102 may be verified sources of resource locations.

The security computer 106 is a type of computing device (e.g., a laptop, a desktop, a Personal Digital Assistant (PDA), a mobile phone and/or the like), such as those generally known in the art. The security computer 106 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits and the like. The memory 114 comprises at least one Read Only Memory (ROM), Random Access Memory (RAM), disk drive storage, optical storage, removable storage and the like. The memory 114 further includes various data, such as location information 116 and relationship data 118. The memory 114 includes various software packages, such as a manager 120.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

According to one or more embodiments, the location information 116 includes published resource locations and associated time data (e.g., time periods). For example, a person may be a resource who uses a Global Positioning System (GPS)-enabled mobile phone, which publishes a current location (e.g., continuously or at fixed time intervals). Hence, the location information 116 includes the current location of the person during a particular time period. At some point, the person may desire to perform a transaction, such as an Automated Teller Machine (ATM) withdrawal. Naturally, a bank computer examines the published resource locations to determine whether to authorize the ATM withdrawal.

The relationship data 118 indicates one or more dependencies established between various ones of the plurality of publisher computers 102 and the plurality of subscriber computers 104. For example, a publisher computer may form a relationship with a subscriber computer. Accordingly, the publisher computer communicates resource locations to the security computer 106, which are subsequently requested and/or accessed by the subscriber computer.

The manager 120 cooperates with the plurality of publisher computers 102 and the plurality of subscriber computers 104 to secure transactions using published resource locations. According to one or more embodiments, the manager 120 includes software code that is configured to create relationships between various ones of the plurality of publisher computers 102 and various ones of the plurality of subscriber computers 104. Notably, the manager 120 updates the relationship data 118 to reflect such relationships. In one embodiment, the manager 120 examines the relationship data 118 to identify a particular publisher computer and a related subscriber computer for a resource. The particular publisher computer periodically communicates resource locations to the manager 120 for storage in the location information 116. Subsequently, the related subscriber computer communicates a transaction request to the manager 120 for verification of a location of the resource.

In operation, the manager 120 authorizes one or more transaction requests pertaining to one or more resources using the location information 116. The manager 120 aggregates resource locations from the plurality of publisher computers 120 to generate the location information 116. According to one or more embodiments, the manager 120 compares the location information 116 to a transaction request to verify a location of a resource. In one embodiment, the manager 120 processes a particular transaction request from an entity (e.g., a particular subscriber computer) to identify a resource location to be verified. Then, the manager 120 examines the relationship data 118 to identify a related publisher computer for the resource.

Accordingly, the manager 120 compares one or more published resource locations with the resource location to be verified. If there is match with a published resource location for a particular time period, the manager 120 communicates a message indicating a verified location of the resource. As a result, the transaction request is authorized. On the other hand, if there is not match, the manager communicates a message indicating that the resource location cannot be verified and thus, the transaction request cannot be authorized. In one embodiment, two or more publisher computers communicate the one or more published resource locations. If the one or more published resource locations conflict, then the manager 120 selects a published resource location that is a best estimate (e.g., a published resource location that is closest to a timestamp of the transaction request).

As described above, a GPS-enabled phone may periodically publish resource locations for a person. For example, the location information 116 may indicate that the person is in New Jersey between eight PM and eight AM and in New York between eight AM to eight PM. Subsequently, a bank may receive an ATM withdrawal request from New York at 5 PM. The bank communicates a request to the manager 120 that the location of New York be verified. If a timestamp associated with the ATM withdrawal request is between eight AM and eight PM, then the ATM withdrawal request is to be authorized. On the other hand, if the timestamp associated with the ATM withdrawal request is between eight PM and eight AM, then the ATM withdrawal request is not to be authorized.

Alternatively, the person may actually be in Pennsylvania on business. As such, the location information 116 reflects a current resource location of Pennsylvania. Therefore, the ATM withdrawal request is not to be authorized because the resource location of New York cannot be verified. In another alternative embodiment, the location information 116 may include future published resource locations. For example, the person may be preparing for a vacation in New Mexico. Naturally, a hotel in New Mexico may attempt a credit card transaction. Accordingly, the manager 120 verifies the resource location of New Mexico because the location information 116 indicates that the person is to be in New Mexico that night.

Furthermore, the current location of Pennsylvania may be in conflict with the future resource location of New Mexico. In such embodiments, the manager 120 may select a published resource location having a time range that is closest to a timestamp associated with the credit card transaction. If the credit card transaction was requested an hour before the person is to board a plane to New Mexico, the manager 120 selects the future resource location of New Mexico to be compared with the credit card transaction.

Figure 2:
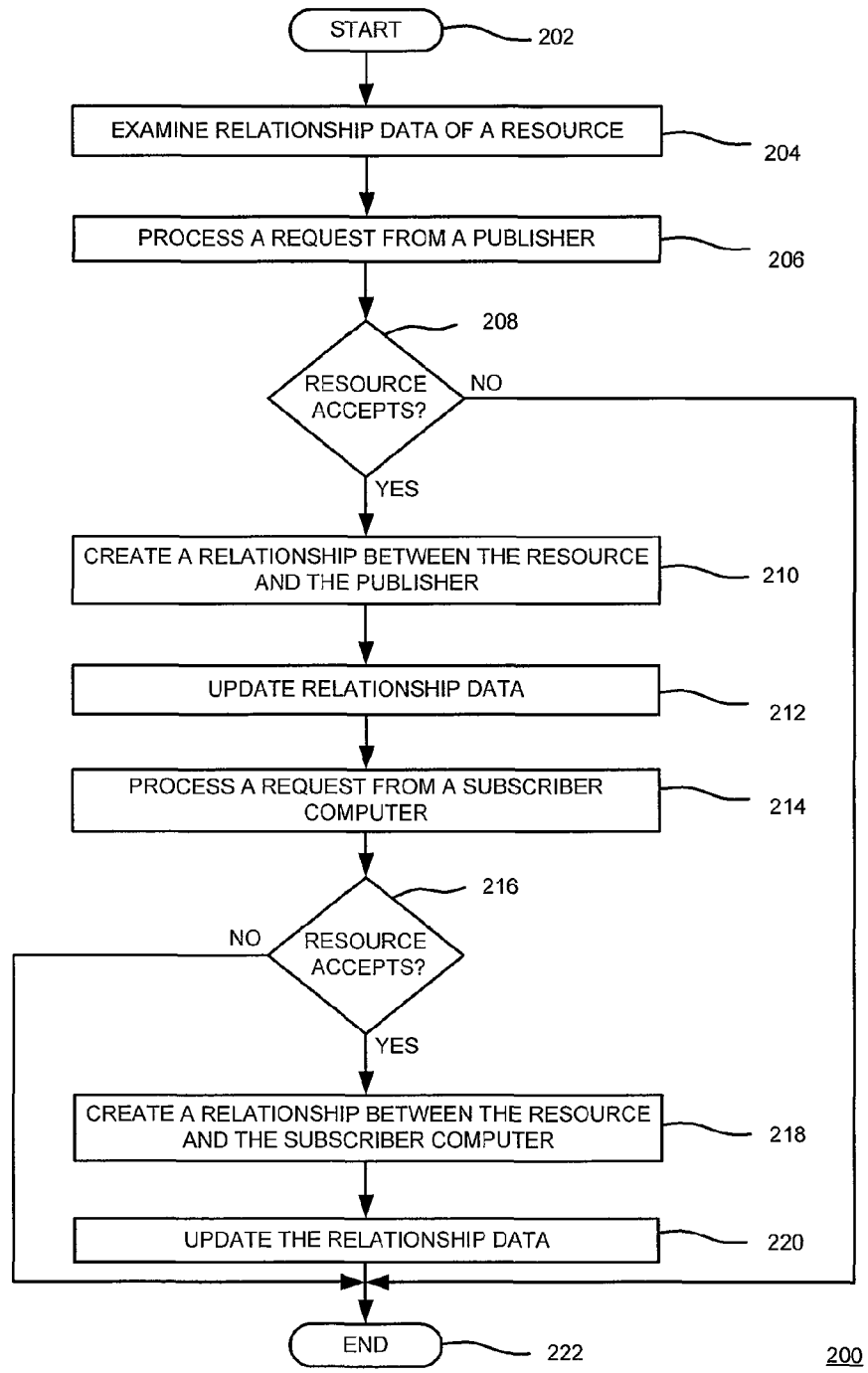
FIG. 2 is a flow diagram of a method for creating relationships between various publisher computers and various subscriber computers according to one or more embodiments of the present invention.

FIG. 2 is a flow diagram of a method 200 for creating relationships between various publisher computers and various subscriber computers for a resource according to one or more embodiments. The method 200 starts at step 202 and proceeds to step 204, at which relationship data of a resource is examined. In one embodiment, a manager (e.g., the manager 120 of FIG. 1) examined the relationship data.

At step 206, a request from a publisher computer is processed. At step 208, a determination is made as to whether the resource accepts the request. If the resource accepts the request, the method 200 proceeds to 210. If the resource accepts the request, the method 200 proceeds to 222. At step 210, a relationship between the resource and the publisher computer is created. At step 212, the relationship data is updated. At step 214, a request from a subscriber computer is processed. At step 216, a determination is made as to whether the resource accepts the request. If the resource accepts the request, the method 200 proceeds to 218. If the resource accepts the request, the method 200 proceeds to 222. At step 218, a relationship between the resource and the subscriber computer is created. At step 220, the relationship data is updated. At step 222, the method 200 ends.

Figure 3:
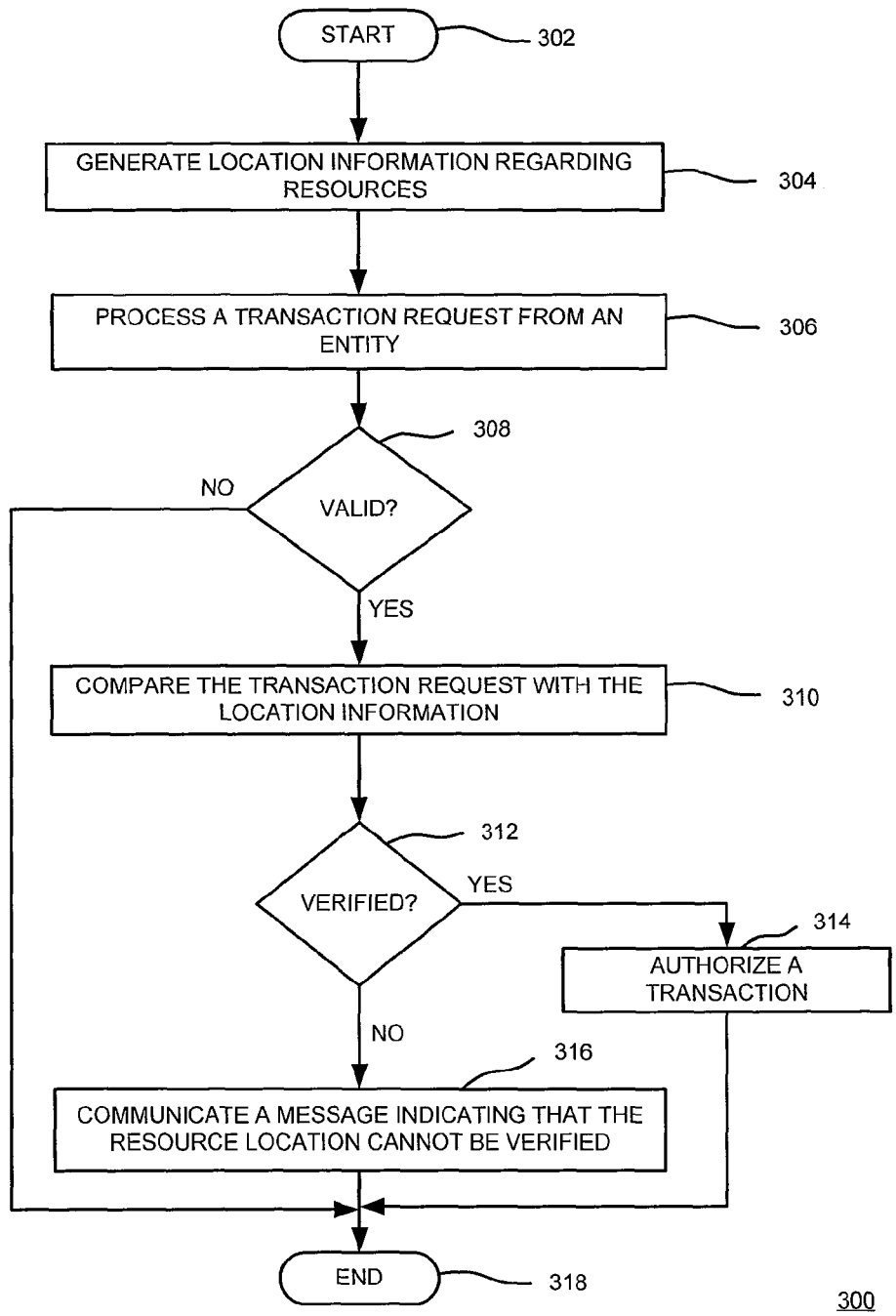
FIG. 3 is a flow diagram of a method for securing transactions using verified resource locations according to one or more embodiments of the present invention.

FIG. 3 is a flow diagram of a method 300 for securing transactions using verified resource locations according to one or more embodiments. The method 300 starts at step 302 and proceeds to step 304. At step 304, location information regarding a resource (e.g., location information 116 of FIG. 1) is generated. At step 306, a transaction request from an entity is processed. At step 308, a determination is made as to whether the entity is a valid subscriber computer. If the entity is a valid subscriber computer, then the method 300 proceeds to step 310. If the entity is not a valid subscriber computer, then the method 300 proceeds to step 318. At step 312, a determination is made as to whether a resource location can be verified. If the resource location is verified, the method 300 proceeds to step 314. At step 314, the transaction request is authorized. If the resource location cannot be verified, the method 300 proceeds to step 316. At step 316, a message indicating that the resource location cannot be verified is communicated. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
   receiving location information during one or more time periods, wherein
      the location information identifies published resource locations that correspond to a resource,
      the published resource locations comprise at least one published resource location that is applicable to a future time period,
      the location information is received from one or more publisher computers, and
      the location information is received by a security computer;
   receiving a transaction request, wherein
      the transaction request relates to the resource, and
      the resource represents an entity that migrates from a first location to a second location;
   in response to the receiving, identifying a resource location to be verified, wherein
      the identifying is performed by the security computer,
      the resource location identifies a location of the resource at a time at which the transaction request is received, and
      the transaction request is received during the future time period;
   identifying a published resource location for the resource during the future time period by examining relationship data, wherein
      the relationship data establishes a relationship between the resource and the one or more publisher computers,
      the relationship data further establishes a relationship between the resource and a subscriber computer,
      the published resource locations comprise a set of conflicting published resource locations during the future time period,
      the set of conflicting published resource locations comprise the at least one published resource location,
      the identifying the published resource location comprises selecting one of the conflicting published resource locations, and
      the identifying the published resource location is performed by the security computer; and
   determining whether to verify the resource location by comparing the resource location and the published resource location, wherein
      the determining is performed during the future time period, and
      the determining is performed by the security computer.

2. The method of claim 1, further comprising:
   validating the one or more publisher computers, wherein the validating is based on the relationship data.

3. The method of claim 1, further comprising:
   validating the subscriber computer, wherein the validating is based on the relationship data.

4. The method of claim 1, further comprising:
   verifying the resource location by determining that the resource location matches the published resource location during the future time period.

5. The method of claim 1, further comprising:
   communicating a message indicating that the resource location cannot be verified.

6. The method of claim 1, further comprising:
   creating at least one relationship between the one or more publisher computers and the subscriber computer.

7. An apparatus comprising:
   a manager configured to
      receive location information during one or more time periods, wherein
         the location information identifies published resource locations that correspond to a resource,
         the published resource locations comprise at least one published resource location that is applicable to a future time period, and
         the location information is received from one or more publisher computers,
      receive a transaction request, wherein
         the transaction request relates to the resource, and
         the resource represents an entity that migrates from a first location to a second location,
      identify a resource location to be verified, in response to receiving the transaction request, wherein
         the resource location identifies a location of the resource at a time at which the transaction request is received, and
         the transaction request is received during the future time period;
      identify a published resource location for the resource during the future time period by examining relationship data, wherein
         the relationship data establishes a relationship between the resource and the one or more publisher computers,
         the relationship data further establishes a relationship between the resource and a subscriber computer,
         the published resource locations comprise a set of conflicting published resource locations during the future time period,
         the set of conflicting published resource locations comprise the at least one published resource location, and
         the identifying the published resource location comprises selecting one of the conflicting published resource locations, and
      determine whether to verify the resource location by comparing the resource location and the published resource location, wherein
         the determining is performed during the future time period.

8. The apparatus of claim 7, wherein the manager is further configured to:
   validate the one or more publisher computers based on the relationship data.

9. The apparatus of claim 7, wherein the manager is further configured to:
   validate the subscriber computer based on the relationship data.

10. The apparatus of claim 7, wherein the manager is further configured to:
    verify the resource location by determining that the resource location matches the published resource location during the future time period.

11. The apparatus of claim 7, wherein the manager is further configured to:
    communicate a message indicating that the resource location cannot be verified.

12. The apparatus of claim 7, wherein the manager is further configured to:
    create at least one relationship between the one or more publisher computers and the subscriber computer.

13. A system comprising:
    at least one subscriber computer configured to communicate at least one transaction request, wherein
        the transaction request relates to a resource, and
        the resource represents an entity that migrates from a first location to a second location,
    one or more publisher computers configured to communicate location information during one or more time periods, wherein
        the location information identifies published resource locations that correspond to the resource, and
        the published resource locations comprise at least one published resource location that is applicable to a future time period; and
    a security computer coupled to the subscriber computer and the publisher computer, comprising:
        a manager configured to
            receive the location information during the one or more time periods,
            receive the transaction request,
            identify a resource location to be verified, in response to receiving the transaction request, wherein
                the resource location identifies a location of the resource at a time at which the transaction request is received, and
                the transaction request is received during the future time period,
            identify a published resource location for the resource during the future time period by examining relationship data, wherein
                the relationship data establishes a relationship between the resource and the one or more publisher computers,
                the relationship data further establishes a relationship between the resource and a subscriber computer,
                the published resource locations comprise a set of conflicting published resource locations during the future time period,
                the set of conflicting published resource locations comprise the at least one published resource location, and
                the identifying the published resource location comprises selecting one of the conflicting published resource locations, and
            determine whether to verify the resource location by comparing the resource location and the published resource location during the future time period.

14. The system of claim 13, wherein the manager is further configured to:
    validate the one or more publisher computers based on the relationship data.

15. The system of claim 13, wherein the manager is further configured to:
    validate the subscriber computer based on the relationship data.

16. The system of claim 13, wherein the manager is further configured to:
    verify the resource location by determining that the resource location matches the published resource location during the future time period.

17. The system of claim 13, wherein the manager is further configured to:
    communicate a message indicating that the resource location cannot be verified.

18. The system of claim 13, wherein the manager is further configured to:
    create at least one relationship between the one or more publisher computers and the subscriber computer.

* * * * *